United States Patent
Majd et al.

(10) Patent No.: US 8,135,691 B2
(45) Date of Patent: Mar. 13, 2012

(54) DETERMINING DATABASE RELATIONSHIPS THROUGH QUERY MONITORING

(75) Inventors: Mahdad Majd, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1886 days.

(21) Appl. No.: 10/961,735

(22) Filed: Oct. 8, 2004

(65) Prior Publication Data
US 2006/0080287 A1    Apr. 13, 2006

(51) Int. Cl.
*G06F 7/00* (2006.01)
(52) U.S. Cl. ........................................... 707/705
(58) Field of Classification Search .............. 707/100, 707/2, 3, 999.1, 999.102; 395/601, 603
See application file for complete search history.

(56) References Cited

U.S. PATENT DOCUMENTS

| | | | | |
|---|---|---|---|---|
| 5,737,591 A * | 4/1998 | Kaplan et al. | | 707/1 |
| 6,785,668 B1 * | 8/2004 | Polo et al. | | 707/2 |
| 6,957,225 B1 * | 10/2005 | Zait et al. | | 707/102 |
| 2002/0091678 A1 * | 7/2002 | Miller et al. | | 707/3 |

OTHER PUBLICATIONS

Hammad et al. "Efficient Execution of Sliding-Window Queries Over Data Streams", Dec. 2003, Purdeu University.*

* cited by examiner

*Primary Examiner* — Charles Rones
*Assistant Examiner* — Dinku Gebresenbet
(74) *Attorney, Agent, or Firm* — Martin & Associates LLC; Derek P. Martin

(57) ABSTRACT

An apparatus and method monitor database queries and allow determining database relationships from the analysis of the database queries. The database relationships are inferred from the analysis of the database queries. The result sets of queries are analyzed to determine if any relationships between the columns specified in the queries may be inferred. In one embodiment, when a relationship between columns is discovered from analyzing query results, a system administrator is notified. In another embodiment, the relationship is stored so it may be retrieved and viewed at a later time by the system administrator.

1 Claim, 5 Drawing Sheets

Customer 200

| custid | name | homeaddress | customer_level | customer_due_date |
|---|---|---|---|---|
| 1 | Smith | 1432 30$^{th}$ St | 1 | 1/27/04 |
| 2 | Jones | 72 18$^{th}$ Ave | 1 | 2/27/04 |
| 3 | Brown | 3922 Fir Lane | 1 | 3/27/04 |
| 4 | Davis | 1405 32$^{nd}$ St | 2 | 4/27/04 |
| 5 | Green | 1111 Park Dr. | 1 | 5/27/04 |

FIG. 2

Billing 300

| id | fname | billing info | paid_status | process_date |
|---|---|---|---|---|
| 1 | Smith | 1432 30$^{th}$ St | Y | 2/4/04 |
| 3 | Brown | 3922 Fir Lane | Y | 4/4/04 |
| 6 | King | 666 Ash Dr. | Y | 7/4/04 |

FIG. 3 select name from customer where custid=? — 410
select billing_info from billing where id=? — 420

FIG. 4

Inferred Relationship
customer.custid/billing.id

FIG. 5 select name from customer where custid=? —— 610
update billing set paid_status=? where id=? —— 620

Inferred Relationship
customer.custid/billing.id

810 select customer_due_date from customer where custid=?
update billing set process_date=? where id=? —— 820

Inferred Relationship
customer.customer_due_date/billing.process_date

DETERMINING DATABASE RELATIONSHIPS THROUGH QUERY MONITORING

BACKGROUND OF THE INVENTION

1. Technical Field

This invention generally relates to computer systems and more specifically relates to a database apparatus and methods.

2. Background Art

Many modern computer systems are a complex combination of different hardware and software that are interconnected on a network. Networks allow computers to share information. Shared information may be stored in a central database. As the need for databases has grown, the complexity of databases has grown as well. In addition, as databases evolve over time, their structure and organization changes. The structure and organization of a database are referred to as the database "schema". The job of a database administrator is to manage and maintain a database. In order to effectively manage a database, a database administrator must know and understand the database schema. However, many database administrators have been on the job for significantly less time than the database has been running. Oftentimes, there is little or no documentation that specifies the current schema of the database.

Database tools have been developed that help create database schemas and that help to understand the relationships between tables, indexes, and other database objects. These tools make the management of a database easier. For example, one tool known as Erwin marketed by Computer Associates is a data modeling tool that helps the average programmer and database administrator to not only make changes to a schema, but to also help in understanding the current schema design. Erwin is a trademark of Computer Associates. Referential constraints and triggers also help to further encapsulate the database design. However, even with all of the new tools and database features available in the prior art, understanding the design of a database and all of its relationships can still be a daunting task. In fact, even the best database architects/administrators miss relationships during their design, not necessarily because of oversight but because administrators are not necessarily familiar with the actual data in the columns. The problem that arises is one of usability. Without understanding all of the database relationships, one cannot fully use the database model to facilitate the retrieval of data. Furthermore, missing database relationships can lead to bad design when changes are made to the schema itself.

Many schemas are created without the help of modeling tools and are therefore more prone to errors. In addition, many schemas were created and are still used today that did not have these modeling tools available when they were first created. For the many reasons given above, most database schemas do not include all relationships in the database. Without a way to determine relationships in a database that are not included in the current schema, the database industry will continue to be plagued by incomplete relationship information when making changes to a database.

DISCLOSURE OF INVENTION

According to the preferred embodiments, an apparatus and method monitor database queries and allow determining database relationships from the analysis of the database queries. The database relationships are inferred from the analysis of the database queries. The query results are analyzed to determine if any relationships between the columns specified in the queries may be inferred. In one embodiment, when a relationship between columns is discovered from analyzing query results, a system administrator is notified. In another embodiment, the relationship is stored so it may be retrieved and viewed at a later time by the system administrator.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 2 is a first sample database table used to illustrate specific examples in accordance with the preferred embodiments;

FIG. 3 is a second sample database table used to illustrate specific examples in accordance with the preferred embodiments;

FIG. 4 illustrates two sample queries for the tables in FIGS. 2 and 3 from which a database relationship may be inferred;

FIG. 5 shows the inferred relationship for the queries in FIG. 4;

BEST MODE FOR CARRYING OUT THE INVENTION

The present invention allows determining relationships in a database that are not represented in the defined database schema. Queries to the database are monitored, and the query results are analyzed to determine whether the query results allow inferring relationships in the database that are not in the schema. The inferred relationships include relationships that exist due to data values stored in the database.

Figure 1:
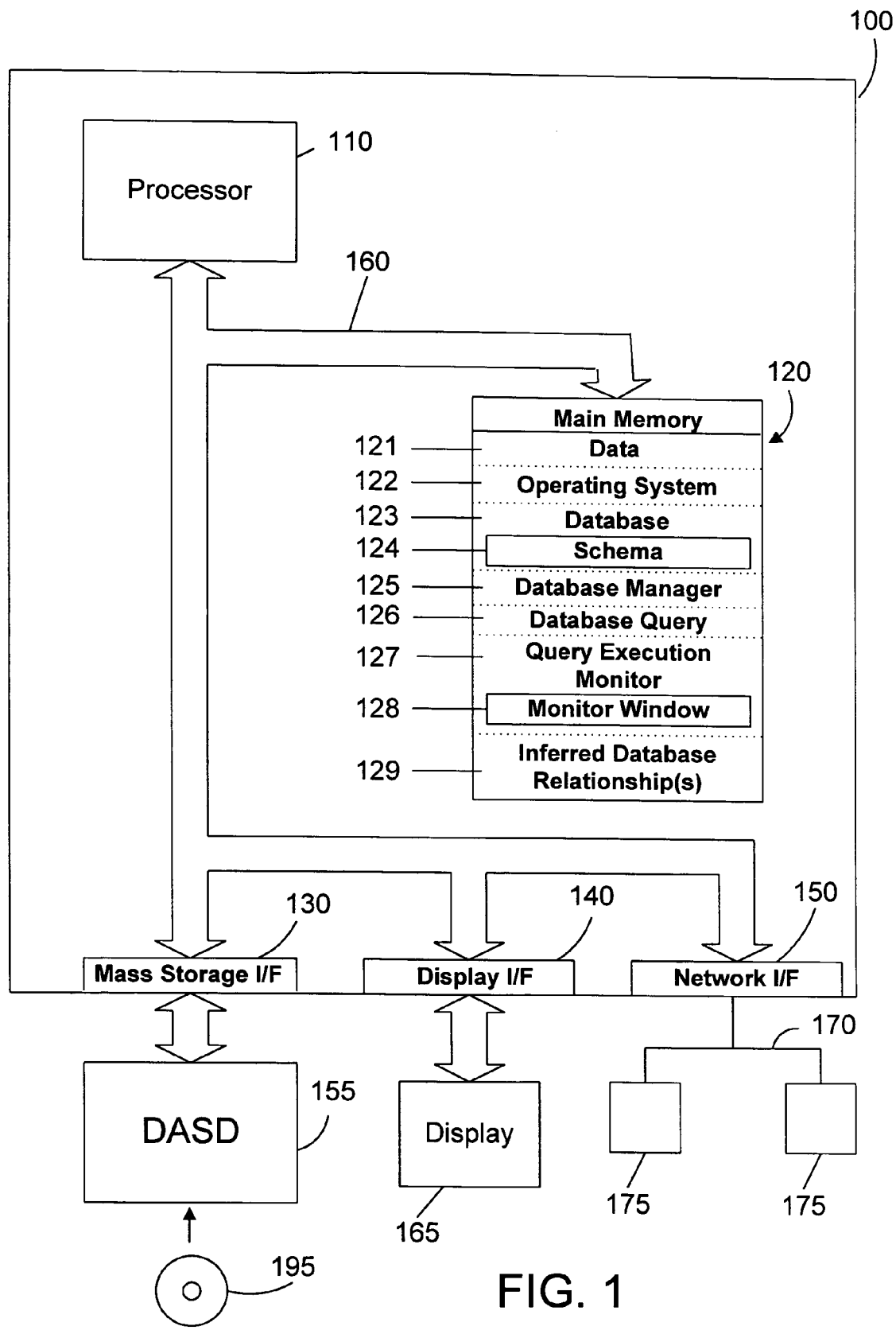
FIG. 1 is a block diagram of an apparatus in accordance with the preferred embodiments.

Referring now to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device 155 is a readable and writable CD RW drive, which may store data to and read data from a CD RW 195.

Main memory 120 in accordance with the preferred embodiments contains data 121, an operating system 122, a database 123, a database manager 125, one or more database queries 126, a query execution monitor 127, and one or more inferred database relationships 129. Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. Database 123 is any suitable database, whether currently known or developed in the future. Database 123 preferably includes a defined schema 124 that specifies many relationships within the database 123. Database manager 125 executes queries 126 to database 123 and returns the query results. Database query 126 is a query in a format compatible with the database 123 that allows information stored in the database 123 that satisfies the database query 125 to be retrieved. Query execution monitor 127 monitors execution of the database queries 126 in accordance with the preferred embodiments. Query execution monitor 127 analyzes queries that lie within a defined monitor window 128. Query execution monitor 127 determines from the monitoring of queries in the monitor window 128 whether any relationships in the database may be inferred from the query results. If so, the inferred database relationship 129 is stored in memory 120.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, database 123, database manager 125, database query 126, query execution monitor 127, and inferred database relationships 129 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD RW (e.g., 195 of FIG. 1), and transmission type media such as digital and analog communications links.

Referring to FIG. 2, a sample table 200 is shown for illustrating the concepts of the preferred embodiments. FIG. 3 likewise shows another sample table 300. Note that none of the column names in table 200 match any of the column names in table 300. However, a quick visual inspection of tables 200 and 300 indicate that some of the columns contain identical or similar data.

Referring now to FIG. 4, two queries 410 and 420 are shown. The first query 410 queries the customer table 200 in FIG. 2. The second query 420 queries the billing table 300 in FIG. 3. We assume for this simple example that a defined schema (e.g., schema 124 in FIG. 1) exists for the database that includes tables 200 and 300, and that this defined schema does not indicate any relationship between the columns in table 200 and the columns in table 300. We assume that the query execution monitor 127 monitors the execution of queries 410 and 420 in FIG. 4 by the database manager 125. We assume that the query execution monitor 127 defines a monitor window 128 that determines which queries are analyzed together. The monitor window 128 may specify a number of queries (e.g. 5), a time period (e.g., 10 seconds), or commitment control (e.g., 2 transactions). The value of the monitor window 128 may be set or changed by a user of the query monitor, such as a database administrator. We assume for this example that queries 410 and 420 in FIG. 4 both lie within the monitor window 128, regardless of how the monitor window 128 is defined. One way for the query execution monitor 127 to monitor the execution of queries 410 and 420 is to look at the host variable used when the queries are executed. For example, if the "?" in both queries 410 and 420 is replaced with the same host variable "customer_id" in the application executing the queries, we know that there is a relationship between custid in table 200 and id in table 300. In addition, a database trace could be run to determine that the custid used in the first query 410 and the id used in the second query 420 contain the same data for the common records. This relationship can thus be determined by detecting a relationship between columns, or by detecting identical data in the two columns. The inferred relationship shown in FIG. 5 is determined by the query execution monitor 127 monitoring the execution of queries 410 and 420.

Figures 6, 7, 8, 9, 10:
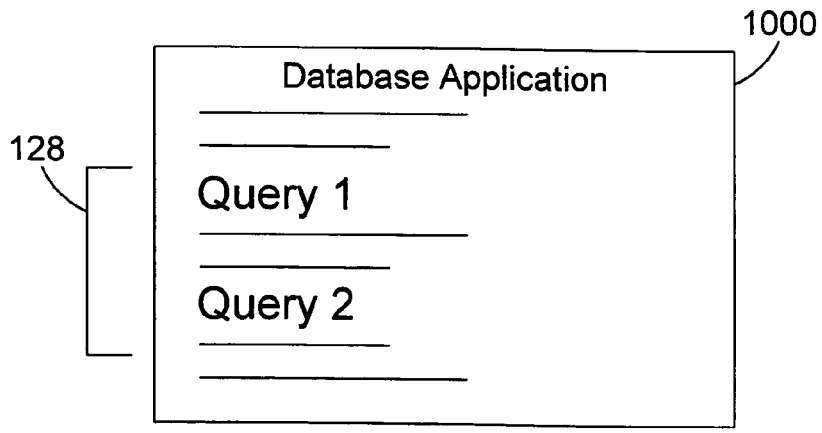
FIG. 6 illustrates two sample queries for the tables in FIGS. 2 and 3 from which a database relationship may be inferred.
FIG. 7 shows the inferred relationship for the queries in FIG. 6.
FIG. 8 illustrates two sample queries for the tables in FIGS. 2 and 3 from which a database relationship may be inferred.
FIG. 9 shows the inferred relationship for the queries in FIG. 8.
FIG. 10 is a diagram showing a monitor window in accordance with a preferred embodiment for a sample database application.

Referring to FIG. 6, another set of queries 610 and 620 illustrate that queries other than select statements may be monitored by the query execution monitor 127. Query 610 reads from table 200 in FIG. 2, while query 620 updates table 300 in FIG. 3. Using the same methods described above for queries 410 and 420 in FIG. 4, the query execution monitor 127 may analyze the execution of queries 610 and 620 in FIG. 6 to infer a relationship between the custid column in the customer table 200 and the id column in the billing table 300, as shown in FIG. 7. We see from this simple example that database relationships may be inferred even when different query types are used.

A more complicated example is now presented to illustrate how relationships in a database may be determined even when the host variables and data do not match. We assume that queries 810 and 820 in FIG. 8 are executed by a database application program. These queries 810 and 820 need not be executed one right after the other, so long as they lie within the defined monitor window 128. We assume for this example that the customer_due_date column in the customer table 200 of FIG. 2 is not a date field, but is a text field that contains a character representation of the date. We further assume that the a database application reads a value from the customer_due_date column in the customer table 200 via query 810, adds seven to the character representation of the date, converts the character representation of the date to a date field, and updates the process_date column of the billing table 300 with the resulting date field via query 820. The internal logic of the database application is not visible to the query execution monitor 127, but a relationship between the customer_due_date column in the customer table 200 and the process_date column in the billing table 300 may still be inferred. While this type of relationship may be difficult to detect, it is nevertheless detectable. Detecting such relationships is akin to cracking codes, and in this case nothing is being hidden from the code crackers. The code crackers could analyze the content of the columns to determine if they are of the same data type. The code crackers could also analyze the host variables in the application running the queries. In addition, the code crackers could potentially track loads and stores of the host variables in the application code. The inferred relationship between the customer_due_date column of the customer table 200 and the process_date column of the billing table 300 is shown in FIG. 9.

The example shown in FIGS. 8 and 9 discussed above show that relationships may be inferred based not only on relationships between columns, but also based on relationships between stored data. This is a significant feature of the preferred embodiments, the ability to determine data-driven relationships in the database. Such data-driven relationships are never in the database schema, so the ability to detect such relationships is an important advantage of the preferred embodiments.

Many different types of relationships in a database may be inferred in accordance with the preferred embodiments. For example, relationships between database columns may be inferred as shown by the examples in FIGS. 4-7. Data-driven relationship can also be inferred, as shown by the examples in FIGS. 8-9.

FIG. 10 shows a database application 1000 that includes multiple lines of code. The monitor window 128 is shown graphically as a bracket that includes a number of different queries or different lines of code. In addition, as stated above, the monitor window 128 may define a time period. Queries executed within the monitor window 128 are analyzed to see if relationships may be inferred between these queries. Regardless of whether the monitor window is a specified number of instructions or queries, or a time period, the monitor window is a type of sliding window that advances as new instructions or queries are executed. Thus, for the specific example illustrated in FIG. 10, the monitor window is defined to span five instructions in the database application, which includes two queries Query 1 and Query 2. These two queries are analyzed to see if any relationships in the database may be inferred from these queries. When the next instruction is executed, the monitor window 128 will slide down to include the next instruction, which causes the monitor window 128 to slide past Query 1. Thus, the monitor window 128 advances to include different instructions and queries as the instructions and queries are processed.

Figure 11:
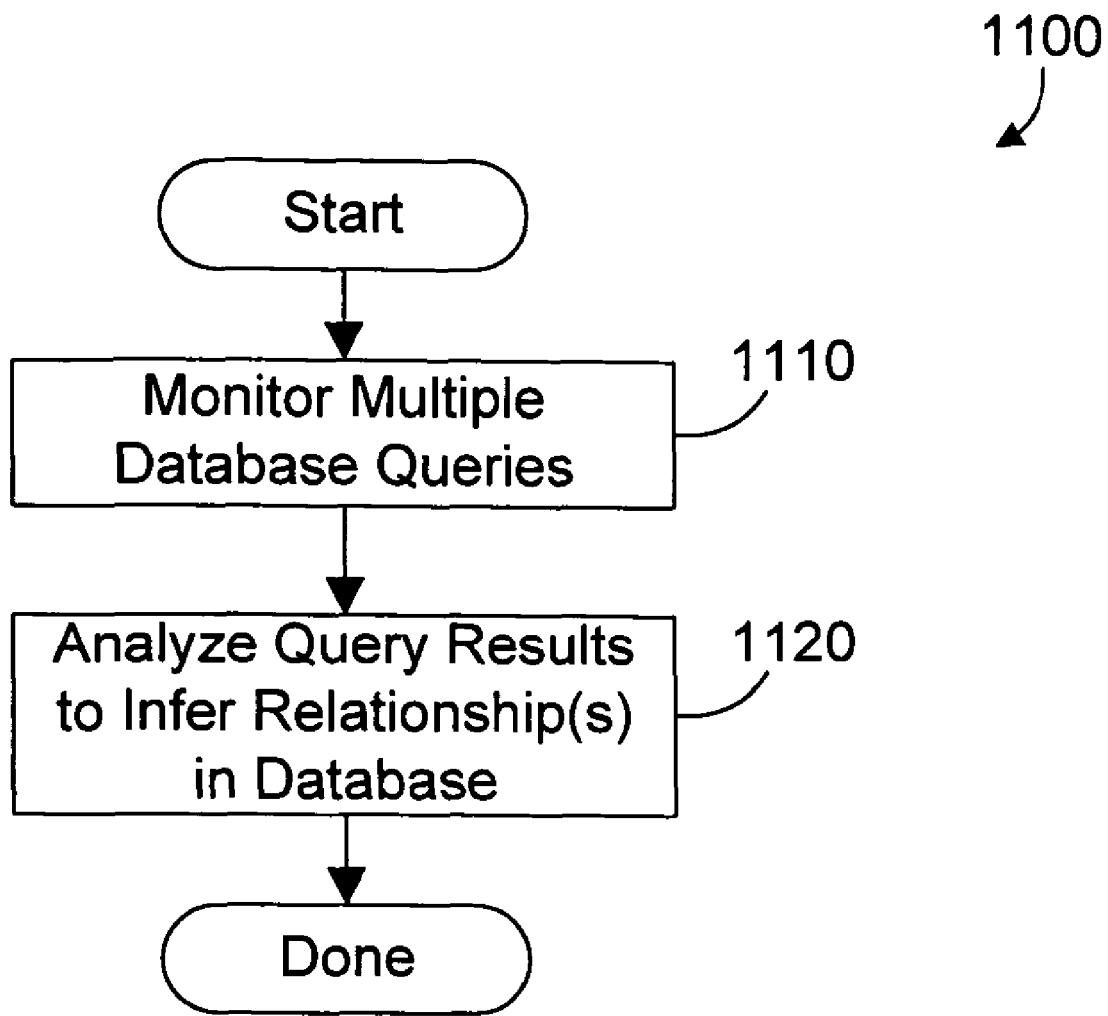
FIG. 11 is a flow diagram of a general method in accordance with the preferred embodiments.

Referring to FIG. 11, a method 1100 in accordance with the preferred embodiments begins by monitoring multiple database queries (step 1110). The query results are analyzed to infer one or more relationships in the database (step 1120). These inferred relationships may be already defined in a schema for the database, but the primary utility of the preferred embodiments is the ability to infer relationships that are not specified in the defined schema.

Figure 12:
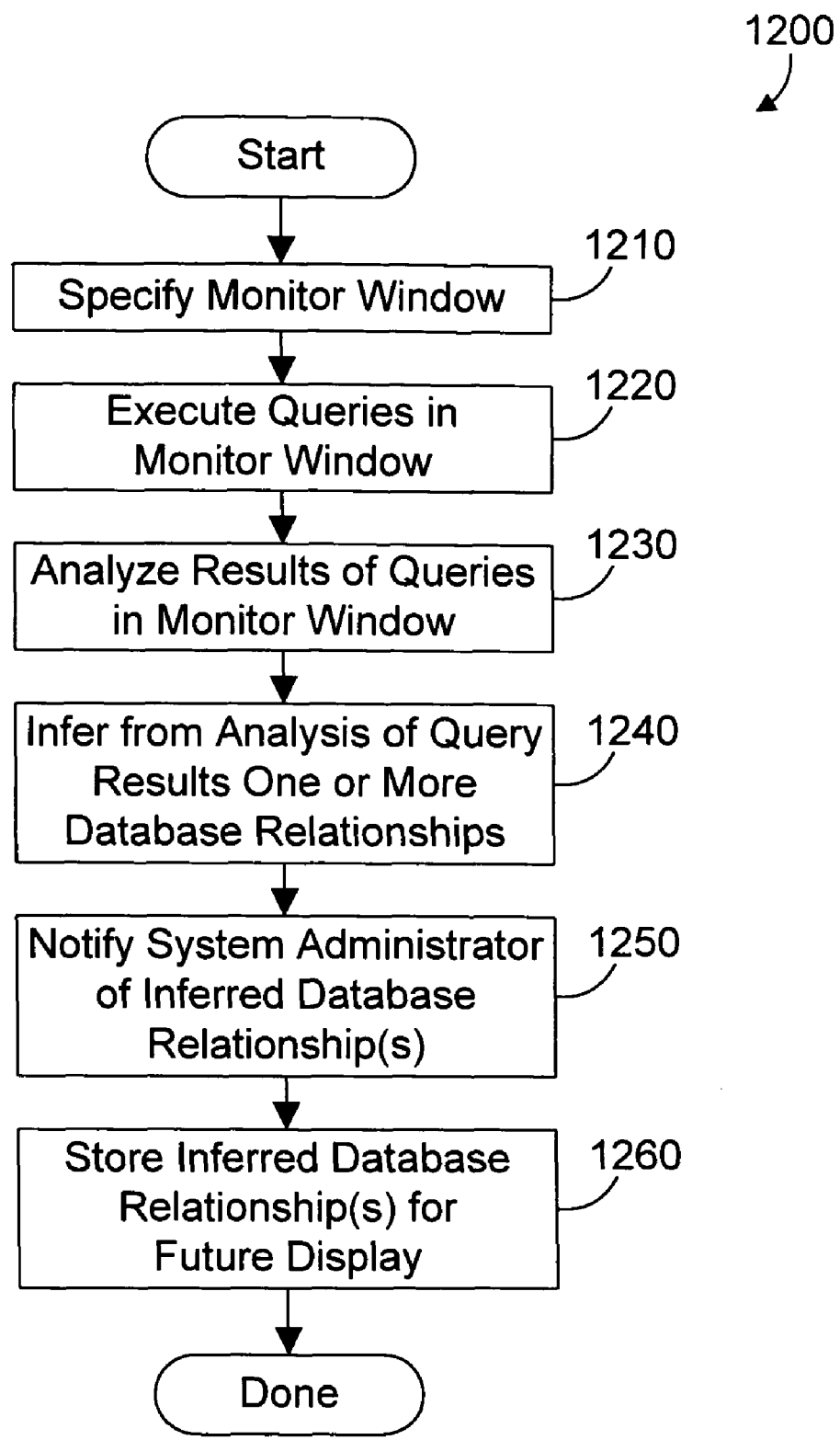
FIG. 12 is a flow diagram of a more specific method in accordance with the preferred embodiments.

A more detailed example of method 1100 is shown in FIG. 12 as method 1200. First, the monitor window is specified (step 1210). As described above, monitor window 128 may be specified by a numerical value (such as 5) that represents the number of instructions or queries to be monitored at one time, may be specified by a time period (such as 10 seconds), or may be specified by commitment control boundaries. Next, the queries in the monitor window are executed (step 1220). The results of executing these queries are then analyzed (step 1230). From the analysis, one or more database relationships may be inferred (step 1240). Once we have identified the inferred database relationships, a system administrator may be notified of these inferred database relationships (step 1250). These inferred database relationships could also be stored for future display to a system administrator or users of the database (step 1260). In one embodiment, step 1260 actually modifies the database schema to include the newly-discovered relationships. In another embodiment, step 1260 stores the inferred relationships separate from the database schema so the system administrator and use can tell the difference between explicitly-defined relationships in the schema and the inferred relationships from the preferred embodiments. Note that steps 1250 and 1260 are optional steps in method 1200.

While it is possible for more than two database queries to lie within the monitor window, in the preferred embodiments two query results are monitored at a time by the query execution monitor to determine whether relationships exist based on the two query results. Thus, if three queries Q1, Q2 and Q3 are located in the monitor window, the query execution monitor would first analyze the results of Q1 and Q2 to determine whether any relationships can be inferred, would then analyze the results of Q2 and Q3 to determine whether any relationships can be inferred, and would then analyze Q1 and Q3 to determine whether any relationships can be inferred. Thus, while it is possible to analyze more than two queries in a monitor window, the analysis is preferably performed by comparing two queries at a time for inferred relationships between the two.

It is easiest to infer database relationships for queries from a common database application. However, the preferred embodiments expressly extend to inferring database relationships for queries from different database applications.

The preferred embodiments allow determining relationships in a database by monitoring query execution and by determining from the query results whether any relationships in the database may be inferred. Inferred database relationships may include relationships that are determined by data stored in the database. The preferred embodiments thus provide a way for a database administrator to learn about relationships in the database that are not specified in the defined database schema. Furthermore, the preferred embodiments provide information regarding data-dependent relationships.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A computer-implemented method for determining at least one relationship in a database, the method comprising the steps of:
   (A) a user setting a value for a monitor window that specifies a time period that identifies a number of queries in a database application to analyze, wherein the monitor window is a sliding window that advances as the database application executes;
   (B) analyzing results of the database application executing the plurality of queries to the database in the monitor window; and
   (C) determining from the analyzed results in step (B) at least one relationship in the database that is defined by data residing in the database and that is not specified in a defined schema for the database between a first column in a first table and a second column in a second table in the database.

* * * * *